(12) United States Patent
Latta et al.

(10) Patent No.: US 11,809,921 B2
(45) Date of Patent: Nov. 7, 2023

(54) SYSTEMS AND METHODS TO COMPUTE A RISK METRIC ON A NETWORK OF PROCESSING NODES

(71) Applicant: Cogility Software Corporation, Irvine, CA (US)

(72) Inventors: Michael Allen Latta, Greeley, CO (US); Shubhra Sankar Biswas, Oak Park, IL (US)

(73) Assignee: Cogility Software Corporation, Irvine, CA (US)

( * ) Notice: Subject to any disclaimer, the term of this patent is extended or adjusted under 35 U.S.C. 154(b) by 100 days.

(21) Appl. No.: 17/464,400

(22) Filed: Sep. 1, 2021

(65) Prior Publication Data

US 2021/0397490 A1 Dec. 23, 2021

Related U.S. Application Data

(63) Continuation of application No. PCT/US2021/032079, filed on May 12, 2021.
(Continued)

(51) Int. Cl.
*G06F 9/54* (2006.01)
*G06F 16/2457* (2019.01)
*G06N 7/01* (2023.01)

(52) U.S. Cl.
CPC ........ *G06F 9/542* (2013.01); *G06F 16/24575* (2019.01); *G06N 7/01* (2023.01)

(58) Field of Classification Search
CPC .... G06F 9/542; G06F 16/2457; G06F 11/008; G06N 7/01; H04L 63/1408; H04L 63/20
See application file for complete search history.

(56) References Cited

U.S. PATENT DOCUMENTS

| | | | | |
|---|---|---|---|---|
| 2010/0121783 A1* | 5/2010 | Lyons | ................... | G06Q 40/06 705/37 |
| 2010/0169026 A1* | 7/2010 | Sorenson | ............... | G16B 30/00 702/181 |

(Continued)

OTHER PUBLICATIONS

International Search Report and Written Opinion of the International Searching Authority dated Aug. 23, 2021; International Application No. PCT/US2021/032079; 11 pages total.

*Primary Examiner* — Tuan C Dao
(74) *Attorney, Agent, or Firm* — Womble Bond Dickinson (US) LLP (57) ABSTRACT

Methods and systems for computing a risk metric on a network of processing nodes are disclosed. The method includes receiving a plurality of events at a plurality of processing nodes. The method further includes at a first processing node, processing on a first event and a known instance of a second event to determine whether the first event matches the known instance of the second event. The method further includes in response to determining that the first event does not match the known instance of the second event, terminating the processing without generating an output, and generating a first output event having a resulting probability computed based on a confidence value of the first event and a first probabilistic value of a first missing event, or in response to determining that the first event matches the known instance of the second event, generating the first output event having the resulting probability computed based on the confidence value of the first event.

22 Claims, 8 Drawing Sheets

Related U.S. Application Data

(60) Provisional application No. 63/024,244, filed on May 13, 2020.

(56) References Cited

U.S. PATENT DOCUMENTS

| | | | |
|---|---|---|---|
| 2011/0087639 A1* | 4/2011 | Gurney | G06F 16/2453 |
| | | | 707/690 |
| 2011/0208919 A1* | 8/2011 | Pruthi | G06F 12/0866 |
| | | | 711/E12.017 |
| 2011/0225023 A1* | 9/2011 | Evens | G06Q 30/02 |
| | | | 705/7.31 |
| 2013/0311196 A1* | 11/2013 | Fay | G16H 10/20 |
| | | | 705/2 |
| 2015/0193583 A1* | 7/2015 | McNair | G16H 50/20 |
| | | | 705/2 |
| 2017/0064667 A1* | 3/2017 | Mycek | H04W 64/00 |
| 2017/0220964 A1 | 8/2017 | Datta Ray | |
| 2017/0257452 A1* | 9/2017 | Hoiles | G06N 3/08 |
| 2017/0323274 A1* | 11/2017 | Johnson | G05B 13/041 |
| 2018/0004942 A1* | 1/2018 | Martin | G06F 21/554 |
| 2018/0124091 A1 | 5/2018 | Sweeney et al. | |
| 2018/0365533 A1* | 12/2018 | Sathyanarayana | G06V 20/58 |

\* cited by examiner

| A | B | C |      |
|---|---|---|------|
| F | F | F | 0.01 |
| F | F | T | 0.01 |
| F | T | F | 0.01 |
| F | T | T | 0.01 |
| T | F | F | 0.07 |
| T | F | T | 0.10 |
| T | T | F | 0.10 |
| T | T | T | 0.69 |

| A | B | C |      |         |
|------|-----|-----|------|----------|
| 0.25 | 0.0 | 0.1 | 0.01 | 0.0 |
| 0.25 | 0.0 | 0.9 | 0.01 | 0.0 |
| 0.25 | 1.0 | 0.1 | 0.01 | 0.000225 |
| 0.25 | 1.0 | 0.9 | 0.01 | 0.002250 |
| 0.75 | 0.0 | 0.1 | 0.07 | 0.0 |
| 0.75 | 0.0 | 0.9 | 0.10 | 0.0 |
| 0.75 | 1.0 | 0.1 | 0.10 | 0.00750 |
| 0.75 | 1.0 | 0.9 | 0.69 | 0.46575 |

| A | B | | |
|---|---|---|---|
| 0.8 | 0.6 | 0.01 | 0.0048 |
| 0.8 | 0.6 | 0.01 | 0.0048 |
| 0.8 | 0.4 | 0.01 | 0.0032 |
| 0.8 | 0.4 | 0.01 | 0.0032 |
| 0.2 | 0.6 | 0.07 | 0.0084 |
| 0.2 | 0.6 | 0.10 | 0.012 |
| 0.2 | 0.4 | 0.10 | 0.008 |
| 0.2 | 0.4 | 0.69 | 0.0552 |
| | | | 0.0996 |

FIG. 6C

SYSTEMS AND METHODS TO COMPUTE A RISK METRIC ON A NETWORK OF PROCESSING NODES

CROSS REFERENCE TO RELATED APPLICATIONS

This application is a continuation of International Application No. PCT/US2021/032079 filed on May 12, 2021, which claims the benefit of U.S. Provisional Application No. 63/024,244 filed on May 13, 2020, the disclosures of which are incorporated herein by reference.

FIELD OF THE INVENTION

Embodiments of the present disclosure relate generally to event processing. More particularly, embodiments of the disclosure relate to systems and methods to compute a risk metric on a network of processing nodes.

BACKGROUND

Security of governments, businesses, organizations, and individuals has become increasingly important as such security has been increasingly compromised by a number of individuals and groups. It is therefore important to have security measures that are able to timely and effectively process information that is useful in detecting and preventing potential threats as well as responding to threats that are in the development stage.

With the availability of massive amount of data from a number of sources, such as transaction systems, social networks, web activity, history logs, etc., it has become a necessity to use data technologies for mining and correlating useful and relevant information. Stream processing approaches and event-based systems, which incorporate complex event processing (CEP), have been widely accepted as solutions for handling big data in a number of application areas. CEP refers to a detection of events that have complex relationships, often including a temporal or geographic component. It is a method of tracking and analyzing (i.e., processing) streams of information (data) about things that happen (events), and deriving a conclusion from them. In general, the goal of CEP is to identify meaningful events (e.g., opportunities or threats) in real-time situations and respond to them as quickly as possible.

Unfortunately, current CEP systems have shortcomings such as the assumption that input data (events) is obtained from similar data sources or that they are concrete (without missing inputs or events).

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosure will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present disclosure. However, in certain instances, well-known or conventional details are not described in order to provide a concise discussion of embodiments of the present disclosure.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Embodiments of the disclosure provide systems and methods to compute a risk metric on a network of processing nodes using a probabilistic model (e.g., Bayesian Networks, Markov Chain, etc.), to improve on the security measures of governments, businesses, organizations, individuals, and the like, and address deficiencies in existing event-based systems. A processing node includes accepting input events from one or more sources and producing one or more events from a combination of input events. Input events may be marked as create, update, delete in nature, meaning they are a new piece of data, a revision to a past piece of data, or the removal of a past piece of data. Output event(s) can also be marked as create, update, or delete, meaning the output event can be a new piece of derived data, or a revision to a piece of derived data, or the indication that a past piece of derived data is no longer true.

In an embodiment, the system may process two types of events, such as concrete events, and probabilistic events. Concrete events can be received from outside the system or generated by the system when all required inputs are available. Probabilistic events are those generated by the system to propagate risk/confidence when not all inputs are available and concrete. Thus, probabilistic events serve to propagate assessments in progress that are not yet complete and serve to indicate areas of risk before they mature in full, or to account for missing information that was not collected or was obfuscated. When probabilistic events are propagated through a node's computation the result is a probabilistic event also which accounts for all node inputs concrete and probabilistic.

One type of compute or processing node is an event pattern matching node, another is an explicit computation node from the input events. The computation node can be an SQL (structured query language) node performing a streaming query against input event streams, or the use of an ML (machine learning) model to synthesize output events from input events.

According to one aspect, a method of computing a risk metric on a network of processing nodes is provided. The method includes receiving a plurality of events at a plurality of processing nodes. The method further includes at a first processing node, processing on a first event and a known instance of a second event to determine whether the first event matches the known instance of the second event. The method further includes in response to determining that the first event does not match the known instance of the second event, terminating the processing without generating an output, and generating a first output event having a resulting probability computed based on a confidence value of the first event and a first probabilistic value of a first missing event. Or, in response to determining that the first event matches the known instance of the second event, generating the first output event having the resulting probability computed based on the confidence value of the first event. The method further includes at a second processing node, receiving the first output event as a first input event. The method further includes matching the first input event against a first pattern. The method further includes if the first input event matches the first pattern, generating a new event having a confidence value computed based on a confidence value of the first input event. Or, if the first input event does not match the first pattern, generating the new event having the confidence value computed based on the confidence value of the first input event and a second probabilistic value of a second missing event.

In an embodiment, the method further includes at a third processing node, matching a third event against a second pattern. The method further includes if the third event matches the second pattern, generating a second output event having a resulting probability computed based on a confidence value of the third event, or if the third event does not match the second pattern, generating the second output event having the resulting probability computed based on the confidence value of the third event and a third probabilistic value of a third missing event.

In an embodiment, the method further includes at the second processing node, receiving the second output event as a second input event. The method further includes matching the second input event against a second pattern. If the first input event matches the first pattern and the second input event matches the second pattern, the confidence value of the new event is computed based on the confidence value of the first event and a confidence value of the second input event. Or, if the first input event does not match the first pattern or the second input event does not match the second pattern, the confidence value of the new event is computed based on the confidence value of the first event, a confidence value of the second input event, and the first probabilistic value of the first missing event.

In an embodiment, processing on the first event and the known instance of the second event comprises performing a computation, a structured query language (SQL) query operation, or a machine learning (ML) model to join the first event to the known instance of the second event.

In an embodiment, matching the first input event against the first pattern comprises determining whether the first input event matches a plurality of elements of the first pattern, and in response to determining that the first input event matches the elements of the first pattern, creating a partial solution for each matching element with the first input event filling the matching element for an event type of the first input event.

In an embodiment, matching the first input event against the first pattern further comprises joining the matching elements against event types other than the event type of the first input event, and filtering the partial solutions according to constraints within the first pattern.

In an embodiment, the method further comprises determining that the first input event does not match the first pattern if a partial solution fails a constraint, or determining that the first input event matches the first pattern if each partial solution passes all constraints.

In an embodiment, the resulting probability and the confidence value of the new event are computed by performing a probabilistic computation on a probability table.

In an embodiment, the method further comprises at the first processing node, receiving the second event, determining whether the second event matches the first event, and in response to determining that the second event matches the first event, revising the first output event having the resulting probability computed based on the confidence value of the first event and the first probabilistic value of the first missing event by producing a concrete output event. The method further comprises at the second processing node, revising the confidence value of the new event based on a confidence value of the concrete output event.

Figure 1A:
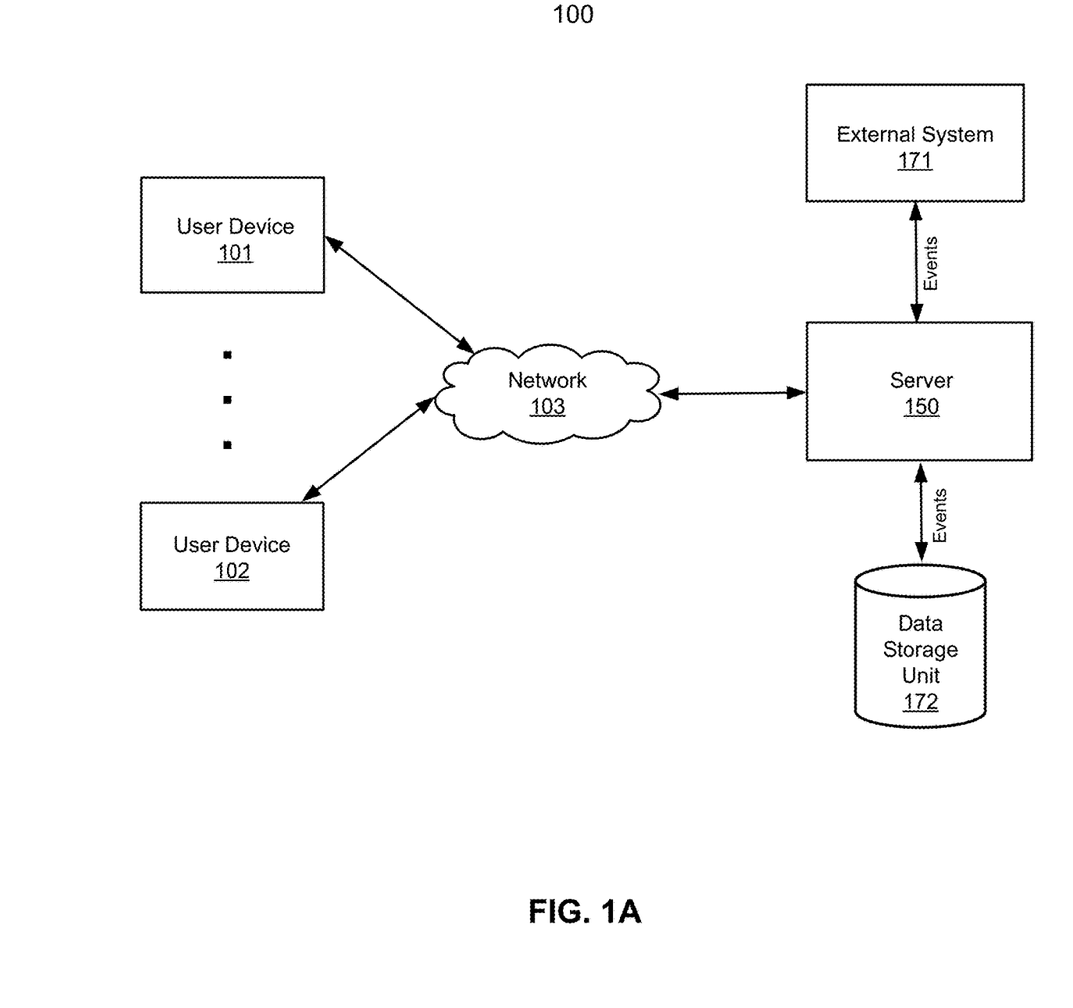
FIGS. 1A and 1B are block diagrams illustrating an example event processing system according to an embodiment.
Figure 1B:
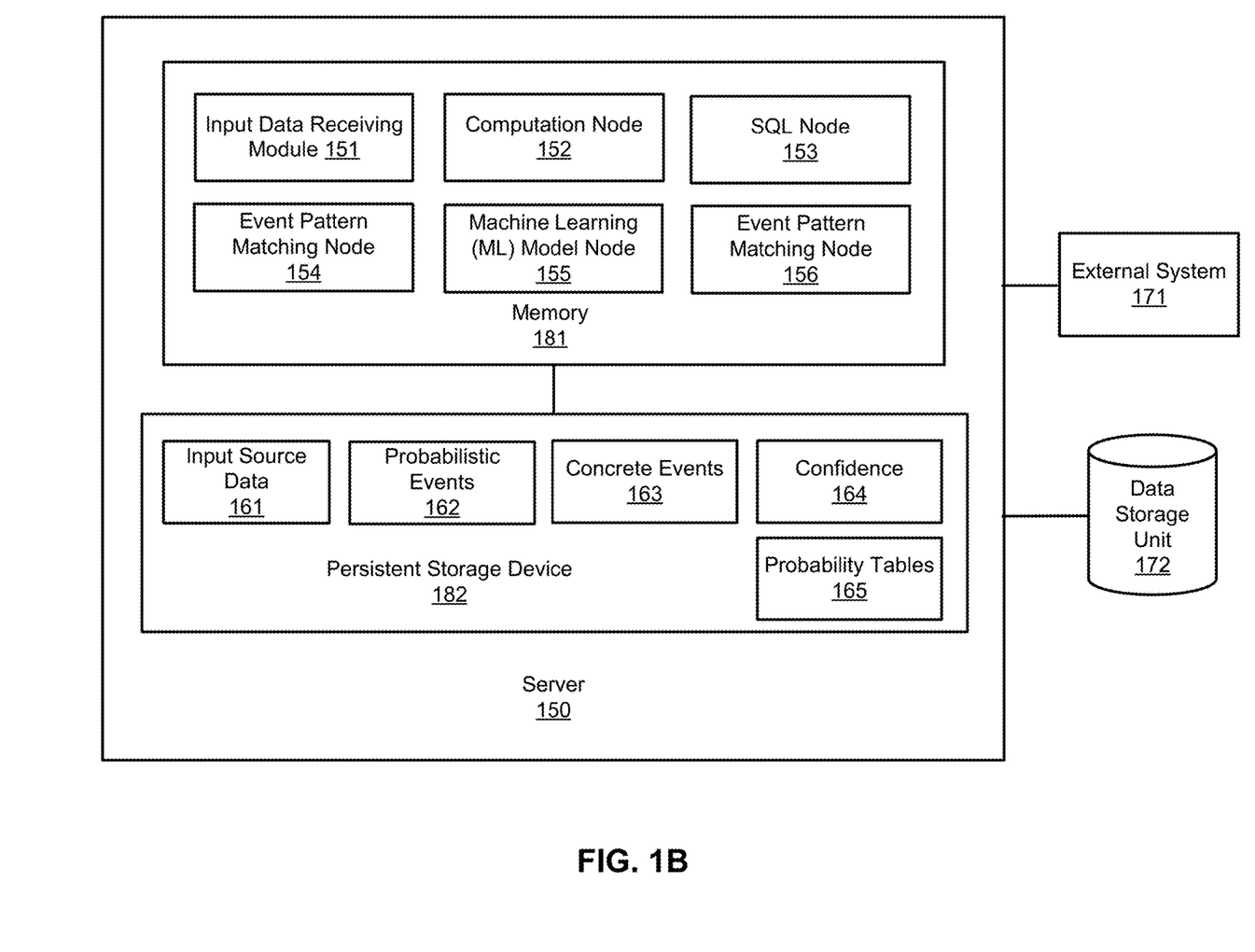

FIGS. 1A and 1B are block diagrams illustrating an event processing system according to one embodiment. Referring to FIG. 1A, event processing system 100 includes, but is not limited to, one or more user devices 101-102 communicatively coupled to server 150 over network 103. User devices 101-102 may be any type of devices such as a host or server, a personal computer (e.g., desktops, laptops, and tablets), a "thin" client, a personal digital assistant (PDA), a Web enabled appliance, a mobile phone (e.g., Smartphone), a wearable device (e.g., Smartwatch), etc. Network 303 may be any type of networks such as a local area network (LAN), a wide area network (WAN) such as the Internet, a fiber network, a storage network, or a combination thereof, wired or wireless.

User devices 101-102 may provide an electronic display along with an input/output capability. Alternatively, a separate electronic display and input/output device, e.g., keyboard, can be utilized in direct electronic communication with server 150. Any of a wide variety of electronic displays and input/output devices may be utilized with system 100. In one embodiment, a user may utilize user devices 101-102 to access a web-page hosted by the server 150 through the network 103. Server 150 may provide a webpage the user can access by using a conventional web browser or viewer, e.g., Safari, Internet Explorer, and so forth, that can be installed on user devices 101-102. Published events may be presented to the user through the webpage. In another embodiment, server 150 may provide a computer application that can be downloaded to user devices 101-102. For example, the user can access a web-page hosted by server 150 to download the computer application. The computer application can be installed on user devices 101-102, which provides the interface for the user to view published events.

With continued reference to FIG. 1A, server 150 is communicatively coupled or connected to external system 171 and data storage unit 172, which may be over a network similar to network 103. Server 150 may be any kind of server or a cluster of servers, such as Web or cloud servers, application servers, backend servers, or a combination thereof. As described in more detail herein below, server 150 may rely on one or more external sources of input events (e.g., text messages, social media posts, stock market feeds, traffic reports, weather reports, or any other kinds of data) and produce one or more sets of output (also events). In some embodiments, server 150 may process different types of events, such as concrete events and probabilistic events. Concrete events can be received from an external system (e.g., external system 171) or generated by server 150 when all required inputs are available. In an embodiment, probabilistic events can be generated by server 150 to propagate risk/confidence when not all inputs are available and concrete. Thus, probabilistic events can serve to propagate assessments in progress that are not yet complete and serve to indicate areas of risk before they mature in full, or to account for missing information that was not collected or was obfuscated. When probabilistic events are propagated through a node's computation the result is a probabilistic event also which accounts for all node inputs concrete and probabilistic.

External system 171 can be any computer system with computational and network-connectivity capabilities to interface with server 150. In one embodiment, external system 171 may include multiple computer systems. That is, external system 171 may be a cluster of machines sharing the computation and source data storage workload. In an embodiment, data storage unit 172 may be any memory storage medium, computer memory, database, or database server suitable to store electronic data. External system 171 may be part of a government, business, or organization performing government functions, business functions, or organizational functions, respectively.

Data storage unit 172 may be a separate computer independent from server 150. Data storage unit 172 may also be a relational data storage unit. In one embodiment, data storage unit 172 may reside on external system 171, or alternatively, can be configured to reside separately on one or more locations.

Referring to FIG. 1B, server 150 includes, but not limited to, input data receiving module 151, computation node 152, SQL node 153, event pattern matching node 154, machine learning (ML) node 155, and event pattern matching node 156. Some or all of modules/nodes 151-156 may be implemented in software, hardware, or a combination thereof. For example, these modules/nodes may be installed on persistent storage device 182 (e.g., hard disk, solid state drive), loaded into memory 181, and executed by one or more processors (not shown) of server 150. Note that some or all of these modules/nodes may be communicatively coupled to or integrated with some or all modules/nodes of server 150. Some of modules/nodes 151-156 may be integrated together as an integrated module/node.

In an embodiment, input data receiving module 151 may receive source data from external system 171 or data storage unit 172. For example, the source data may be pushed where the data is provided directly to server 150 when available (i.e., direct feed). Alternatively, the source data may be pulled where server 150 (i.e., module 151) requests the source data periodically from external system 171, for example through a database query such as Solr, structured query language (SQL), etc. The source data may include input events (e.g., text messages, social media posts, stock market feeds, traffic reports, weather reports, or other kinds of data), and may take any form of structured data and unstructured data (e.g., non-uniform content). Any data such as Extensible Markup Language (XML), Comma-Separated Values (CSV), Java Script Notation (JSON), and Resource Description Framework (RDF) data can be used as structured data. In an embodiment, the source data may be source data that can be mapped with a lexicon (or filtered using lexicon data) from outside sources as described in U.S. Pat. No. 9,858,260, entitled "System and method for analyzing items using lexicon analysis and filtering process", the disclosure of which is incorporated herein by reference. Upon receiving the source data, module 151 may store the source data as input source data 161 on persistent storage device 182.

Computation Node

Computation node 152 may accept source data or events (input source data 161) from one or more sources (e.g., external system 171) and compute a result. Compute operations may include joins of streams (data or event streams), and logic operations (e.g., functions, operators, windowing, etc.). As each event is received, the result of the node may be updated. The input event may not generate a new output if the event is propagated through the computation but generated no different output. In such a computation node, each operation is linked to other operations by explicit input/output associations, such that each source feeds into operations, and the output of operations is then input to another until final output operation(s) are reached. As with other nodes, if no output is produced from a set of data a probabilistic output may result. In both cases, a confidence result is computed using a probabilistic model (e.g., a Bayesian Network or another graphical or statistical model) or ML algorithm/model, and the input event confidences.

SQL Node

SQL node 153 may be similar to computation node 152, but uses a SQL query operation to join multiple streams into a single output stream. In the case of SQL node 153, the result is either produced or not produced in whole. In the case where a result is produced, a probabilistic computation (e.g., a Bayesian computation, or another graphical or statistical computation) or ML algorithm/model can be used to compute the output confidence using input event confidences. In the case where no output results, the probabilistic computation can also be used to compute the output confidence but generates a probabilistic event as output. In some embodiments of SQL processing, it is not possible to detect the lack of output, in which case only output events can be augmented with a risk confidence value based on their input events.

ML Model Node

ML model node 155 may be functionally equivalent to SQL node 153, but with an ML model/algorithm producing the output or no output. In an embodiment, the probabilistic computation (e.g., Bayesian computation, or another graphical or statistical computation) or ML algorithm/model can be used in the same way to assign a confidence to the output or generate a probabilistic output event. In some embodiments of ML processing, it is not possible to detect the lack of output, in which case only output events can be augmented with a risk confidence value based on their input events.

Event Pattern Matching Node

Each of event pattern matching nodes 154, 156 may include a set of elements that collect events, and a set of constraints that are satisfied between them. A constraint refers to a specification of restrictions on an event. Upon matching a pattern, new events can be published. In the case where a pattern is matched, a new event is published and has a confidence based on the confidence of the input events. In the case where an event is not produced, for example due to a partial match of events to the pattern, a placeholder event (which may be referred to as fi) is produced with a probabilistic confidence value based on the inputs available and any probabilistic values for missing inputs. In both cases, a probabilistic model (e.g., a Bayesian Network or another graphical or statistical model) or ML algorithm/model may be used to compute the confidence of the output event.

Risk Model Propagation

Embodiments of the disclosure are used in the context of a set of nodes being used to detect/predict an interpretation of events and the computed confidence is the expected level of risk that, given the known events, that interpretation or a prediction is correct. In other words, if a node consumes (or matches) 2 of 3 events, for example, it can be asked "what is the risk that the third event will occur or has occurred undetected?", and thus the pattern will/did interpret the data correctly. For example, if a pattern is looking for money laundering, it can be asked "did that occur or is it going to occur given the data at hand?"

Nodes form a hierarchy and low-level nodes would, when partially matched or complete, yield probabilistic or concrete events, respectively. These events are used in computing upstream or higher abstraction nodes. Server 150 ensures that a risk value is produced from each node and used in computing the risk level for any pattern to which it is an input.

Figure 2:
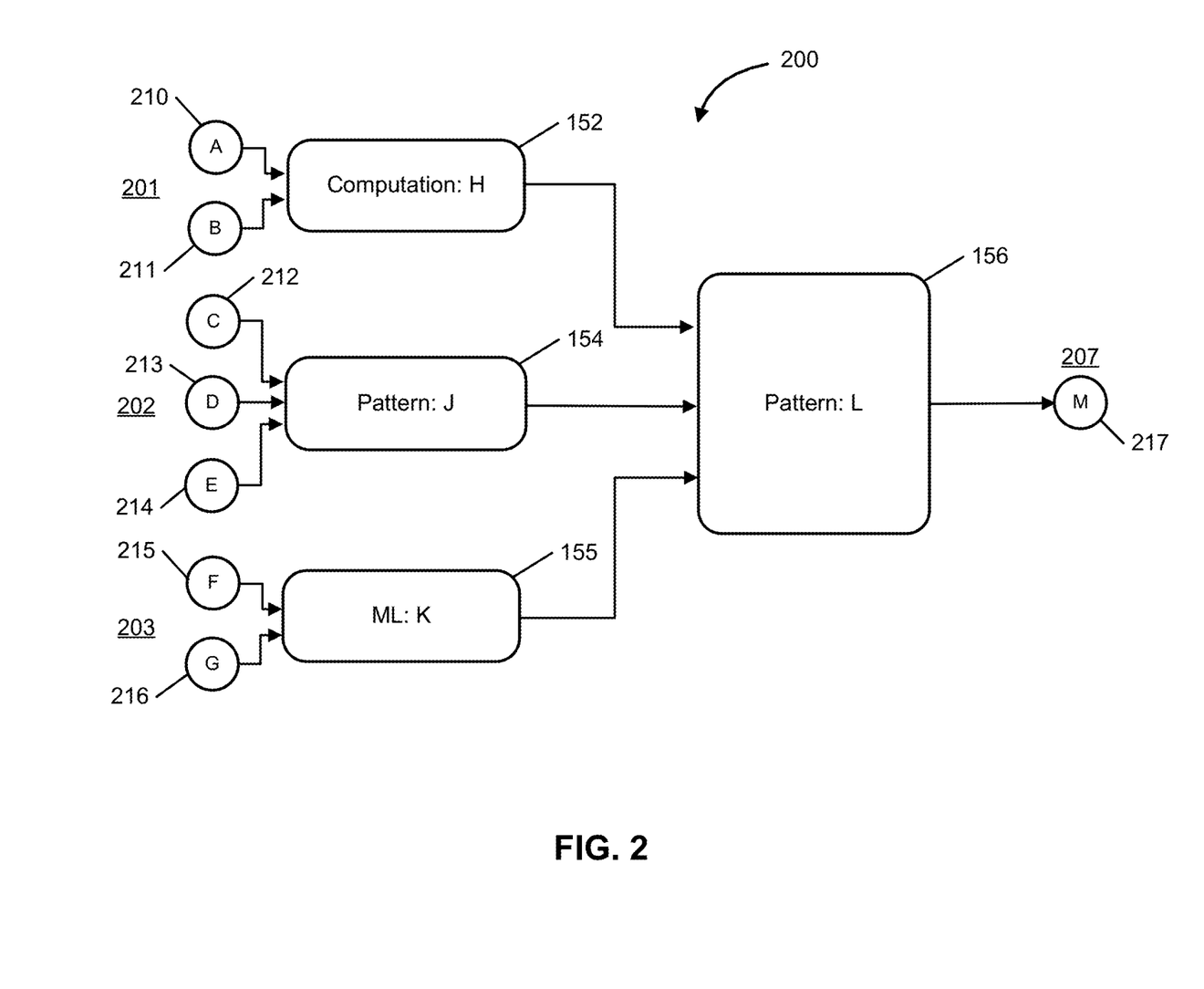
FIG. 2 is a block diagram illustrating an example network of processing nodes according to an embodiment.

FIG. 2 is a block diagram illustrating an example network of processing nodes according to an embodiment. In FIG. 2, risks are computed over node network 200. For example, at 201, there are two events 210-211 having event types A and B, respectively, being input to computation node 152 (also referred to as computation node H). Event types A and B may be of the same event type or different event types. At 202, there are three events 212-214 having event types C, D and E, respectively, being input into event pattern matching node 154 (also referred to as pattern node J). Event types C, D and E may be of the same event type or different event types. At 203, there are two events 215-216 having event types F and G, respectively, being input into ML model node 155 (also referred to as ML model node K). Event types F and G may be of the same event type or different event types. Outputs from nodes 152-155 are provided to event pattern matching node 156 (also referred to as pattern node L), which in turn outputs an event 217 having event type M (at 207).

In an embodiment, risk analysis is enabled on all nodes and the nodes may have various assigned probability tables (as described in more detail below). The following, for example, is a possible sequence of events and the resulting actions by the system.

With continued reference to FIG. 2, in an embodiment, event 210 arrives and is forwarded to computation node H. Generally, an event is an instance of an event type and has the structure defined by its type. Computation node H may attempt to join event 210 to known instances of event 211. If there is no known instance of event 211, computation node H terminates without output and a probability (e.g., Bayesian probability, a probability computed using another graphical/statistical model or ML algorithm/model) is computed given the confidence of event 210 and a probability table associated with computation node H. This results in a probabilistic event input to pattern node L, which is used to construct a probabilistic event 217 of type M.

In an embodiment, event 215 arrives and is forwarded to ML model node K. If the ML model node K produces an output, the output is forwarded to pattern node L. If event 215 and event 210 are related to a same result event, for example, then an earlier or prior instance of probabilistic event 217 may be revised with a new probability. Otherwise, a new instance of event 217 is produced based on the confidence from ML model node K. The confidence from ML model node K, for example, may be computed based the confidence of event 215 and a probability table associated with ML model node K.

When event 211 arrives and if it matches the earlier event 210, the computation node H revises the probabilistic event it produced earlier by producing a concrete output event to pattern node L. Assuming the pattern in pattern node L requires all inputs to pass, it may revise the earlier probabilistic output based on the new confidence from computation node H.

Pattern node J includes a set of elements that collect events 212-214 and a set of constraints that are satisfied between them. Upon matching a pattern, new events can be published or outputted to pattern node L. In the case where a pattern is matched, a new event is published and has a confidence based on the confidence of the input events 212-214. In the case where an event is not produced, for example due to a partial match of events to the pattern, a placeholder event is produced with a probabilistic confidence value based on the inputs available and any probabilistic values for missing inputs. In both cases, a probabilistic model (e.g., a Bayesian Network or another graphical or statistical model) or ML algorithm/model may be used to compute the confidence of the output event.

This continues until pattern node L receives sufficient inputs to make a match, at which time it revises the probabilistic output it previously produced by producing a concrete output with confidence computed from the confidences of its inputs and the probability table for pattern node L. That is, the matching of the number of input events is non-limiting and such matching may repeat for as many input events as required including revisions of prior input events or instances of prior input events. It is noted that while node network 200 of FIG. 2 illustrates four processing nodes (e.g., nodes 152, 154, 155 and 156), the number of processing nodes is non-limiting. In other words, any number and any combination of processing nodes (e.g., pattern matching, SQL, ML model, computation) may exist in an embodiment.

Figure 3:
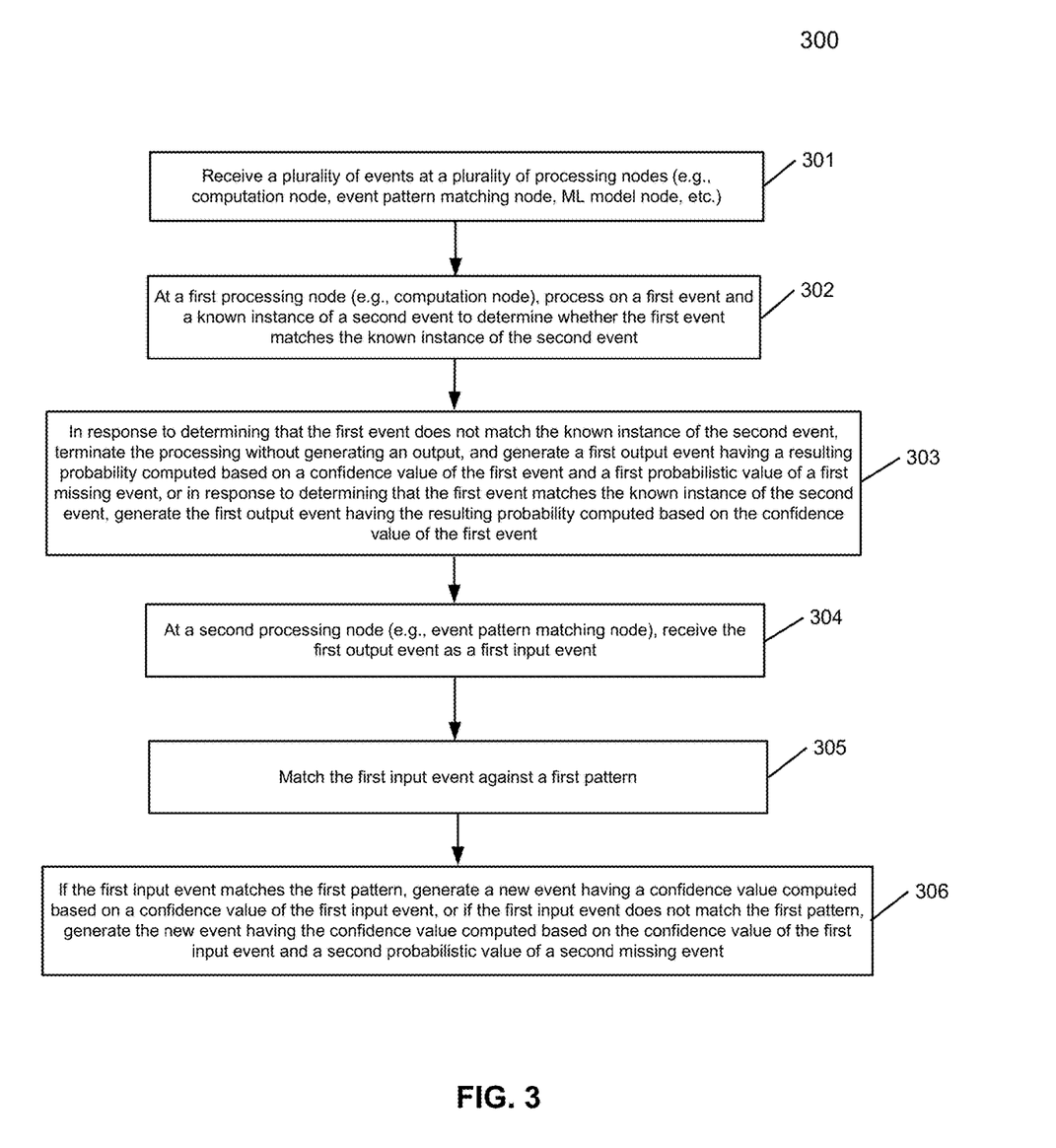
FIG. 3 is a flow diagram illustrating an example method of computing a risk metric on a network of processing nodes according to an embodiment.

FIG. 3 is a flow diagram illustrating an example method of computing a risk metric on a network of processing nodes according to an embodiment. Process 300 may be performed by processing logic which may include software, hardware, or a combination thereof. For example, process 300 may be performed by server 150, e.g., any combination of nodes 152-156 of FIG. 1B.

Referring to FIG. 3, at 301, a plurality of events are received at a plurality of processing nodes (e.g., computation node, event patterning matching node, SQL node, ML model node, etc.). At 302, at a first processing node (e.g., computation node), a first event and a known instance of a second event are processed to determine whether the first event matches the known instance of the second event. At 303, in response to determining that the first event does not match the known instance of the second event, the processing is terminated without generating an output, and a first output event is generated, where the first output event has a resulting probability computed based on a confidence value of the first event and a first probabilistic value of a first missing event. Or, in response to determining that the first event matches the known instance of the second event, the first output event is generated, where the first output event has the resulting probability computed based on the confidence value of the first event. At 304, at a second processing node (e.g., event pattern matching node), the first output event is received as a first input event. At 305, the first input event is matched against a first pattern. At 306, if the first input event matches the first pattern, a new event is generated where the new event has a confidence value computed based on a confidence value of the first input event. Or, if the first input event does not match the first pattern, the new event is generated where the new event has the confidence value computed based on the confidence value of the first input event and a second probabilistic value of a second missing event.

Streaming Considerations

One embodiment is in the context of a streaming computation system, in which events are processed continuously and the risk values and published events are updated continuously. This adds additional concerns, such as frequency of published events and usage of streaming semantics to ensure accurate full and partial risk propagation and computation. Independent time windows can be used to control the volume of probabilistic events vs. concrete events to control overhead of risk computations and propagation times.

Figure 4:
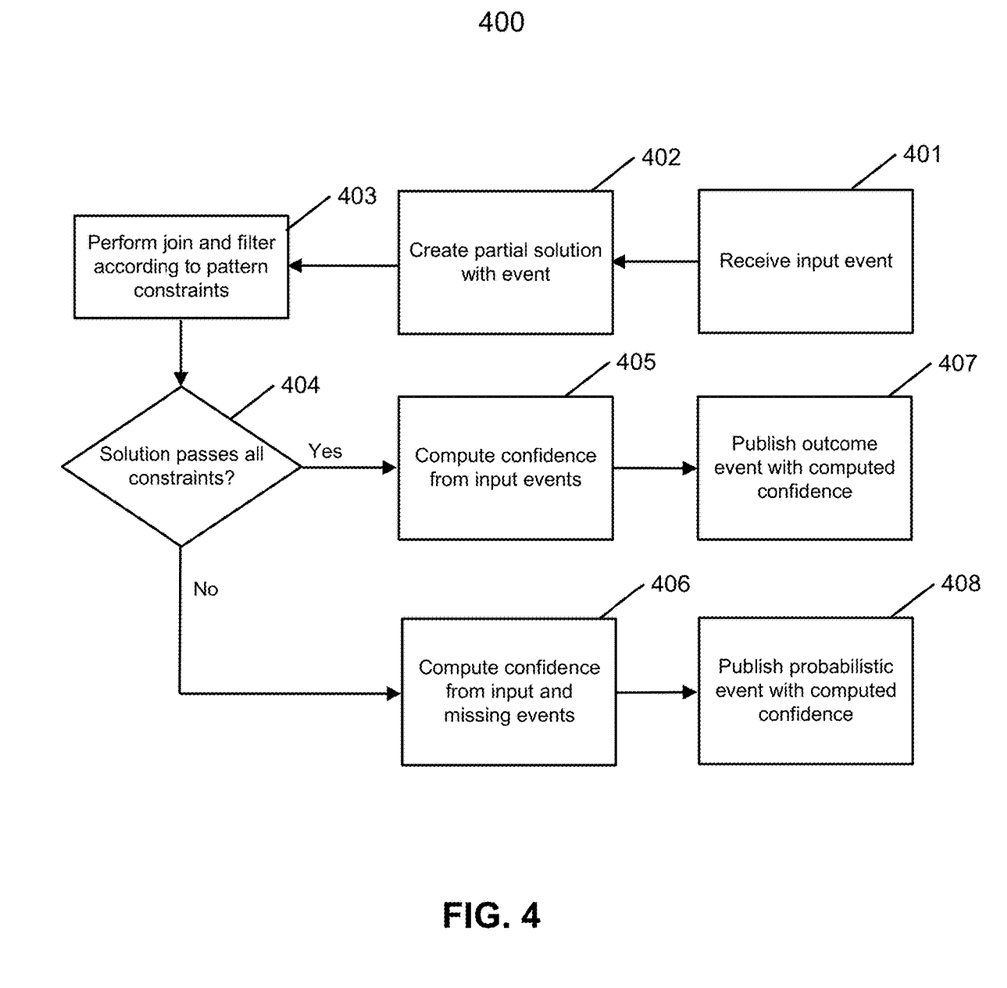
FIG. 4 is a flow diagram illustrating an example method performed by an event pattern matching node according to an embodiment.

FIG. 4 is a flow diagram illustrating an example method performed by an event pattern matching node according to an embodiment. Process 400 may be performed by processing logic which may include software, hardware, or a combination thereof. For example, process 400 may be performed by server 150, e.g., nodes 154, 156 of FIG. 1B. Process 400 may be repeated for each event pattern matching node for which risk assessment is desired and configured.

Referring to FIG. 4, at 401, an input event is received for processing against a pattern. At 402, a partial solution is created with the provided or received event filling an appropriate matching element for an event type of the received event. If the event matches multiple elements, then a partial solution is created for each matching element with the event filling that element.

At 403, the process performs joins against other event types, and filters partial solutions as specified by constraints within the pattern. If a constraint limits the values of two elements and the current solution has not already joined those elements, then a join is performed. If those elements have been joined, then the solution is filtered against the constraint condition. If in the course of performing a join or filter operation the solution is found to fail the constraint, the solution is redirected (at 404) to be processed as a probabilistic solution. Probabilistic solutions proceed through remaining constraints when possible collecting concrete event data where it matches the solution data. This results in either a solution that has all required elements populated with events, or a probabilistic solution with partially filled elements. In the event that a solution passes all constraints, it further must match all multiplicity restrictions (e.g., minimum number of events for each element, or maximum number of events for each element). If the solution passes all constraints and matches all multiplicity restrictions, the solution (outcome event) is provided to 405.

If a solution fails to match the multiplicity restrictions or contains any probabilistic events for input, it is treated as not matching the pattern, and thus as a probabilistic solution (processed at 406). In some streaming systems, a join is preceded by a key extraction action that retrieves the key used in the join from the event. In the event such an operation is required, and the value is missing from the event or the event is missing from the solution a probabilistic solution is created and forwarded to the next join/filter operation. This allows each join to have the opportunity to complete even in the absence of some data in the solution.

In some embodiments, consideration is given as to how joins are performed and the order in which they are performed. In a streaming environment joins involve retention of state information on both sides of the join in the generic case. In cases where one side is a more limited data set performance is gained by distributing the data set to all nodes such that the join can be performed without additional state on the opposing side. Another optimization is the ordering of constraint processing such that subsequent joins are performed that have a shared value. For example, if constraints all involve equality on a field of an event to other events they can be processed sequentially as joins without the need to shuffle data between threads/cores.

In the event that update and delete events are received, they are processed such that the solution is updated accordingly and may produce output event(s) where previously it had not, or not produce output events where it had previously done so. In the case where a previous result had been produced and is no longer produced, then the old event is deleted (a delete event sent), and a probabilistic event produced.

At 405, a fully populated solution uses confidence values (e.g., either from input events or computed by prior pattern risk computations) to compute a confidence value for the solution being processed. This is performed using a probabilistic computation (e.g., Bayesian computation) treating the input confidences as the values for independent variables, and a composite probability table to compute a resulting probability (used as the risk confidence for the output event(s) from the solution).

Figure 6A:
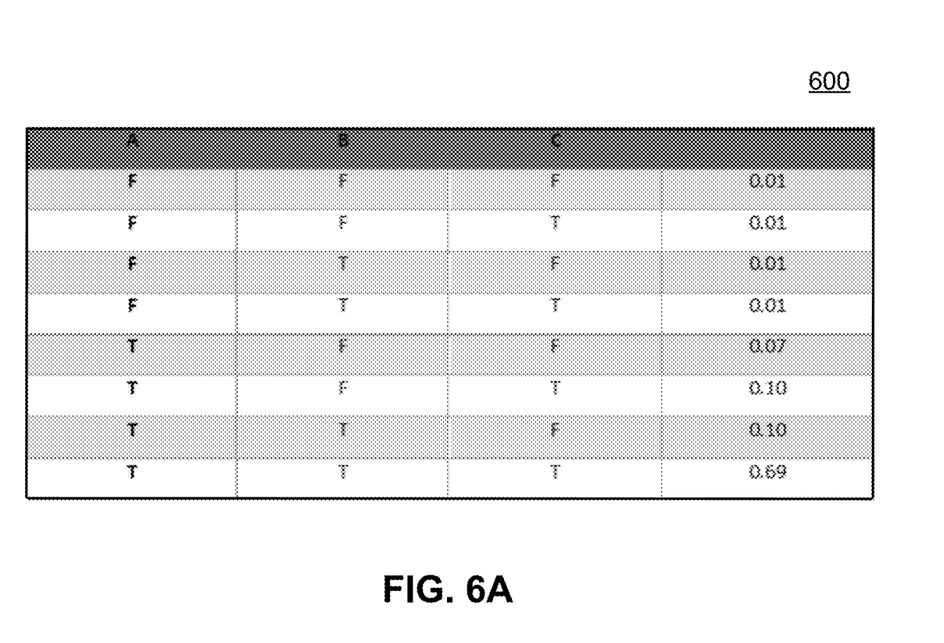
FIG. 6A is a diagram illustrating a probability table according to an embodiment.
Figure 6B:
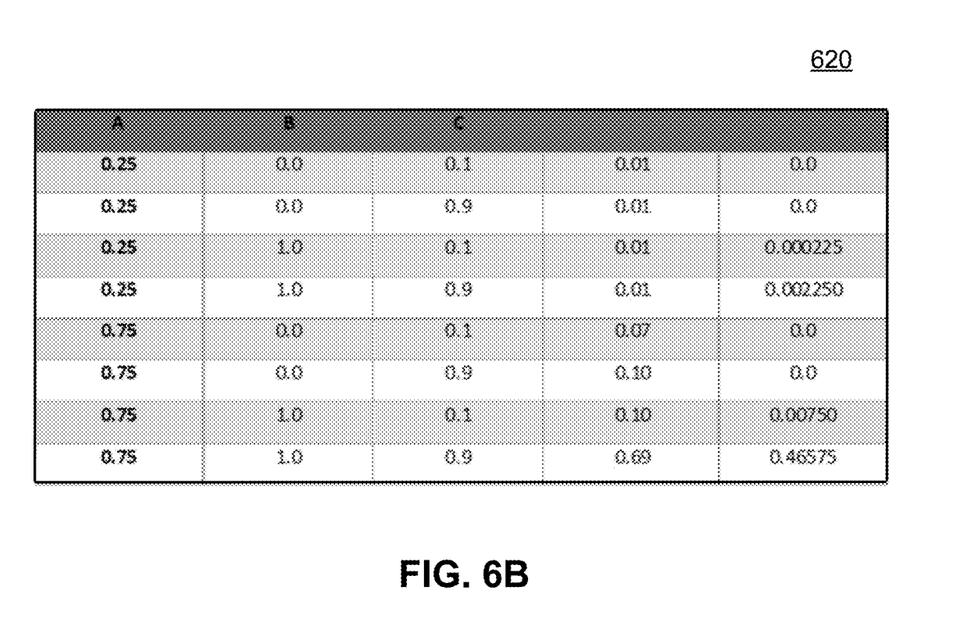
FIG. 6B is a diagram illustrating a probability table with substitutions according to an embodiment.

For example, referring to FIG. 6A, in a pattern with three inputs A, B, C and a solution with events a, b, c, respectively, and a probability table 600 (e.g., Bayesian probability table), the computation of output confidence may take probability table 600 and substitute confidence from a, b, c in all cells for an event present, and the inverse of the confidence for all cells where the event is absent, then take the product of each input confidence including the row probability and sum all rows to get the output confidence. Thus, if a=0.75, b=1.0, and c=0.9 then table 620 (shown in FIG. 6B) would be used to compute the product of each row and the sum of the result to get the output confidence. The output confidence then is the sum of the last column of table 620, which equals 0.475725.

At 406, a partially populated/probabilistic solution uses confidence values where available (e.g., from input events or computed by prior pattern risk computations) to compute a confidence value attributed to the probabilistic output event. The computation is performed using a probabilistic computation (e.g., Bayesian computation) treating the input confidences as the values of the independent variables and eliminating the missing variables using a formula (e.g., Bayesian formula), and the composite probability table to compute the resulting probability (used as the risk confidence for the generated probabilistic output event(s) from the solution).

Figure 6C:
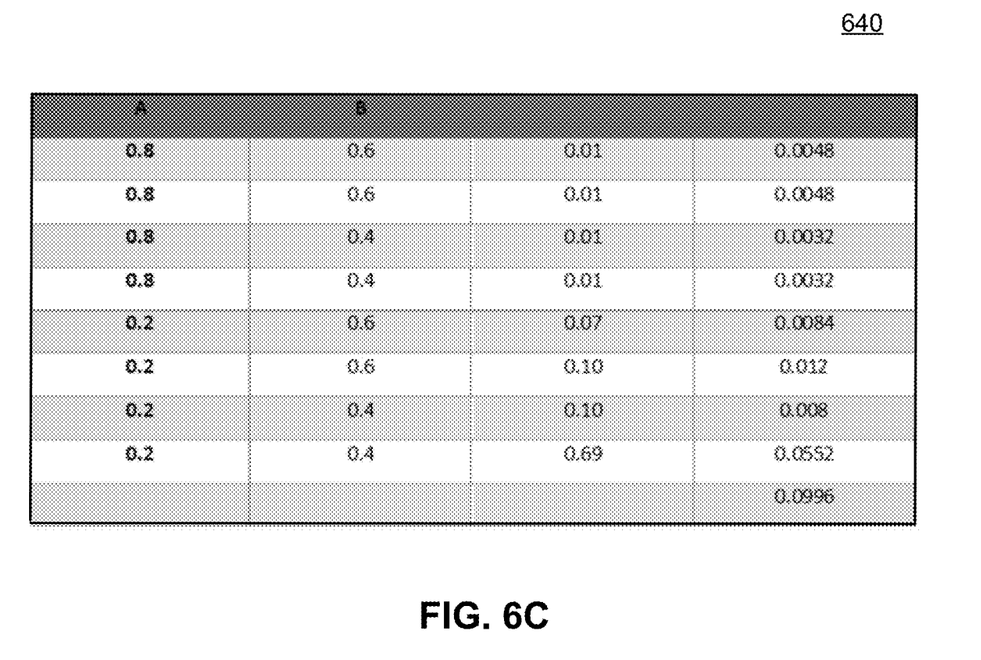
FIG. 6C is a diagram illustrating a probability table with substitutions where an event is missing according to an embodiment.

For example, in a pattern with three inputs A, B, C and a solution with only events a and b, and probability table 600 (shown in FIG. 6A), the computation of output confidence may take probability table 600 and substitute confidence from a, b in each row for the event present, and the inverse of the confidence in cells with A or B absent, take the product of each row including the row probability and sum to get the output confidence. For example, if a has confidence 0.2 and b has 0.4, table 640 (shown in FIG. 6C) would result from table 600, with table 640 having substitutions for a, b and their inverse, then the row being multiplied across and then summed down. It is noted that the values in tables 600, 620, 640 are merely provided as examples and non-limiting, and that tables 600, 620, 640 may include any values.

At 407, a fully populated solution is used to generate or publish an output or outcome event according to pattern specifications, and the computed confidence is attached to the published outcome event.

At 408, a partially populated solution is used to generate or publish a probabilistic output event according to pattern specifications, and the computed confidence is attached to that published output event.

At 407, and 408, if the pattern specifies an output window (i.e., a time period) for the pattern, this can apply to full events and probabilistic events separately. In either case, the output window specification can limit the rate at which events are published per solution. This allows the volume of output events to be limited separate from the rate of input event arrival. Doing so separately allows factual output events to be generated with lower latency than probabilistic events, and to limit the overhead of computing risk values in a high throughput or low latency application.

Figure 5:
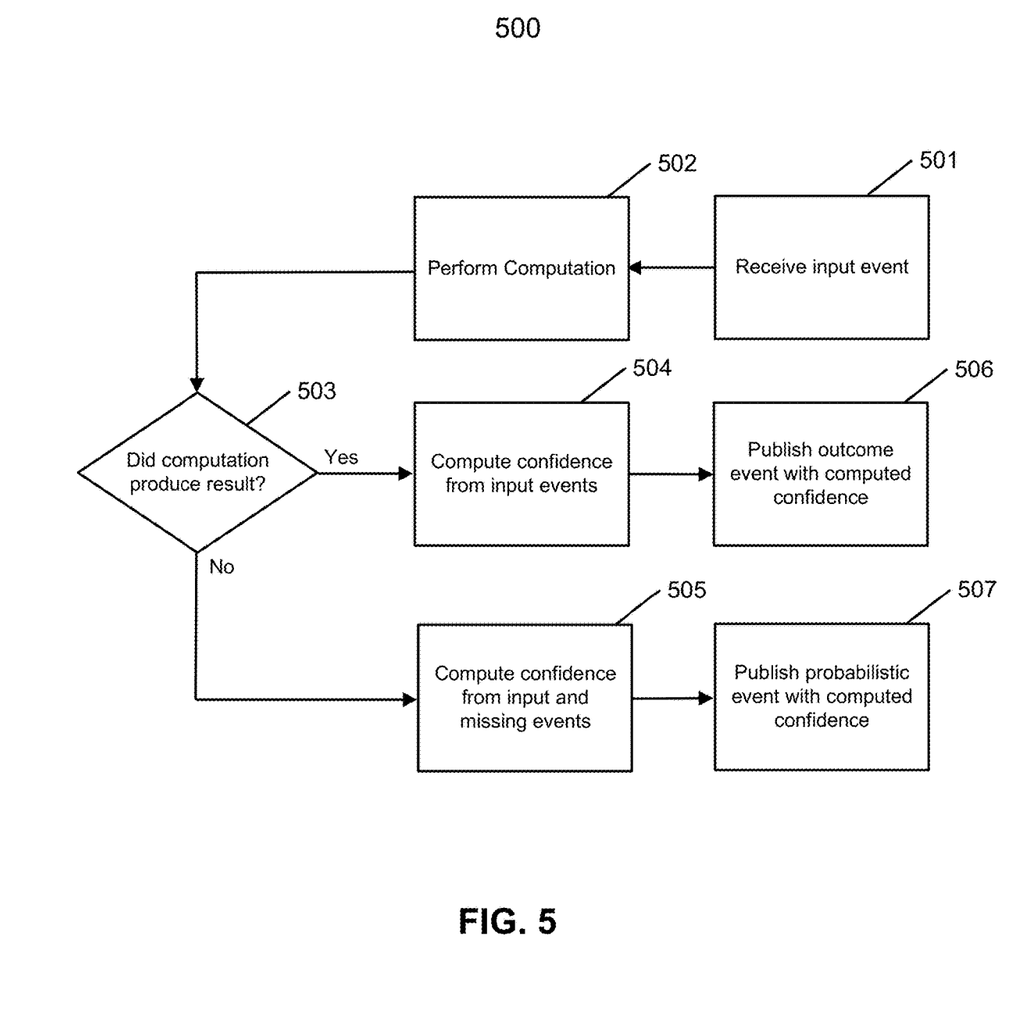
FIG. 5 is a flow diagram illustrating an example method performed by a non-pattern node according to an embodiment.

FIG. 5 is a flow diagram illustrating an example method performed by a non-pattern node according to an embodiment. Process 500 may be performed by processing logic which may include software, hardware, or a combination thereof. For example, process 400 may be performed by server 150, e.g., nodes 152, 153, 155 of FIG. 1B.

Referring to FIG. 5, at 501, an event is received. At 502, a computation (e.g., directed compute, SQL or ML) is performed to produce an output. Unlike process 400 of FIG. 4 and pattern-based processing, the result or lack of result in the compute, SQL, and ML cases is all or nothing, and as such, it only applies in those two cases, and there is no partial processing involved.

Therefore, at 503, if the computation produces an output (or result), the output flows to 504 then subsequently 506. Otherwise, the computation does not produce an output (or result), and the process flows 505 then subsequently 507. Aspects at 504-507 are similar or same as aspects at 405-408 of FIG. 4 (as previously described), respectively. Accordingly, for brevity sake, aspects at 504-507 will not be described herein.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for processing a data stream comprising events, the method comprising:
    receiving, by a server, a data stream comprising a plurality of events at a plurality of processing nodes;
    at a first processing node,
        processing, by the server, on a first event and a known instance of a second event to determine whether the first event matches the known instance of the second event;
        in response to determining that the first event does not match the known instance of the second event, terminating, by the server, the processing without generating an output, and generating, by the server, a probabilistic event having a resulting probability computed based on a confidence value of the first event and a first probabilistic value of a first missing event, or in response to determining that the first event matches the known instance of the second event, generating, by the server, a first output event having a resulting probability computed based on the confidence value of the first event; and at a second processing node, receiving, by the server, the first output event or the probabilistic event as a first input event;

matching, by the server, the first input event against a first pattern;

if the first input event matches the first pattern, generating, by the server, a new event having a confidence value computed based on a confidence value of the first input event, or if the first input event does not match or partially matches the first pattern, generating, by the server, a first placeholder event having a confidence value computed based on the confidence value of the first input event and a second probabilistic value of a second missing event.

2. The method of claim 1, further comprising:
at a third processing node,
matching, by the server, a third event against a second pattern;
if the third event matches the second pattern, generating, by the server, a second output event having a resulting probability computed based on a confidence value of the third event, or
if the third event does not match or partially matches the second pattern, generating, by the server, a second placeholder event having a resulting probability computed based on the confidence value of the third event and a third probabilistic value of a third missing event.

3. The method of claim 2, further comprising:
at the second processing node,
receiving, by the server, the second output event as a second input event;
matching, by the server, the second input event against the second pattern;
wherein
if the first input event matches the first pattern and the second input event matches the second pattern, the confidence value of the new event is computed based on the confidence value of the first event and a confidence value of the second input event, or
if the first input event does not match or partially matches the first pattern or the second input event does not match or partially matches the second pattern, the confidence value of the new event is computed based on the confidence value of the first event, a confidence value of the second input event, and the first probabilistic value of the first missing event.

4. The method of claim 1, wherein processing on the first event and the known instance of the second event comprises performing, by the server, a computation, a structured query language (SQL) query operation, or a machine learning (ML) model to join the first event to the known instance of the second event.

5. The method of claim 1, wherein matching the first input event against the first pattern comprises:
determining, by the server, whether the first input event matches a plurality of elements of the first pattern, and in response to determining that the first input event matches the elements of the first pattern, creating, by the server, a partial solution for each matching element with the first input event filling the matching element for an event type of the first input event.

6. The method of claim 5, wherein matching the first input event against the first pattern further comprises:
joining, by the server, the matching elements against event types other than the event type of the first input event, and
filtering, by the server, the partial solutions according to constraints within the first pattern.

7. The method of claim 6, further comprising:
determining, by the server, that the first input event does not match the first pattern if a partial solution fails a constraint, or
determining, by the server, that the first input event matches the first pattern if each partial solution passes all constraints.

8. The method of claim 1, wherein the resulting probability and the confidence value of the new event are computed by performing a probabilistic computation on a probability table.

9. The method of claim 1, further comprising:
at the first processing node,
receiving, by the server, the second event;
determining, by the server, whether the second event matches the first event;
in response to determining that the second event matches the first event, revising, by the server, the first output event having the resulting probability computed based on the confidence value of the first event and the first probabilistic value of the first missing event by producing a concrete output event; and
at the second processing node,
revising, by the server, the confidence value of the new event based on a confidence value of the concrete output event.

10. The method of claim 1, wherein each of the first output event and the new event is a concrete event.

11. The method of claim 2, wherein
the first processing node is a computation node, a structured query language (SQL) or a machine learning (ML) model node; and
the second and third processing nodes are event pattern matching nodes.

12. A server system, comprising:
a processor; and
a memory coupled to the processor to store instructions, which when executed by the processor, cause the processor to perform operations, the operations including:
receiving a data stream comprising a plurality of events at a plurality of processing nodes;
at a first processing node,
processing on a first event and a known instance of a second event to determine whether the first event matches the known instance of the second event;
in response to determining that the first event does not match the known instance of the second event, terminating the processing without generating an output, and generating a probabilistic event having a resulting probability computed based on a confidence value of the first event and a first probabilistic value of a first missing event, or
in response to determining that the first event matches the known instance of the second event, generating the first output event having a resulting probability computed based on the confidence value of the first event; and at a second processing node,
receiving the first output event or the probabilistic event as a first input event;
matching the first input event against a first pattern;
if the first input event matches the first pattern, generating a new event having a confidence value computed based on a confidence value of the first input event, or
if the first input event does not match or partially matches the first pattern, generating a first placeholder event having a confidence value computed based on the confidence value of the first input event and a second probabilistic value of a second missing event.

13. The server system of claim 12, wherein the operations further include:
at a third processing node,
matching a third event against a second pattern;
if the third event matches the second pattern, generating a second output event having a resulting probability computed based on a confidence value of the third event, or
if the third event does not match or partially matches the second pattern,
generating a second placeholder event having a resulting probability computed based on the confidence value of the third event and a third probabilistic value of a third missing event.

14. The server system of claim 13, wherein the operations further include:
at the second processing node,
receiving the second output event as a second input event;
matching the second input event against the second pattern;
wherein
if the first input event matches the first pattern and the second input event matches the second pattern, the confidence value of the new event is computed based on the confidence value of the first event and a confidence value of the second input event, or
if the first input event does not match or partially matches the first pattern or the second input event does not match or partially matches the second pattern, the confidence value of the new event is computed based on the confidence value of the first event, a confidence value of the second input event, and the first probabilistic value of the first missing event.

15. The server system of claim 12, wherein processing on the first event and the known instance of the second event comprises performing a computation, a structured query language (SQL) query operation, or a machine learning (ML) model to join the first event to the known instance of the second event.

16. The server system of claim 12, wherein matching the first input event against the first pattern comprises:
determining whether the first input event matches a plurality of elements of the first pattern, and
in response to determining that the first input event matches the elements of the first pattern, creating a partial solution for each matching element with the first input event filling the matching element for an event type of the first input event.

17. The server system of claim 16, wherein matching the first input event against the first pattern further comprises:
joining the matching elements against event types other than the event type of the first input event, and
filtering the partial solutions according to constraints within the first pattern.

18. The server system of claim 17, wherein the operations further include:
determining that the first input event does not match the first pattern if a partial solution fails a constraint, or
determining that the first input event matches the first pattern if each partial solution passes all constraints.

19. The server system of claim 12, wherein the resulting probability and the confidence value of the new event are computed by performing a probabilistic computation on a probability table.

20. The server system of claim 12, wherein the operations further include:
at the first processing node,
receiving the second event;
determining whether the second event matches the first event;
in response to determining that the second event matches the first event, revising the first output event having the resulting probability computed based on the confidence value of the first event and the first probabilistic value of the first missing event by producing a concrete output event; and
at the second processing node,
revising the confidence value of the new event based on a confidence value of the concrete output event.

21. The server system of claim 12, wherein each of the first output event and the new event is a concrete event.

22. The server system of claim 13, wherein
the first processing node is a computation node, a structured query language (SQL) or a machine learning (ML) model node; and
the second and third processing nodes are event pattern matching nodes.

\* \* \* \* \*